No. 715,422. Patented Dec. 9, 1902.
M. I. RUBIN.
ARTIFICIAL TOOTH.
(Application filed Feb. 4, 1902.)
(No Model.)
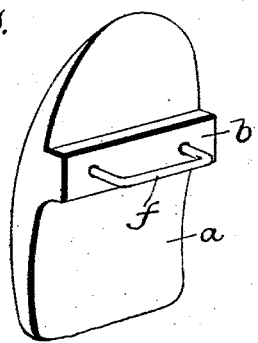
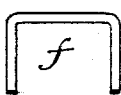
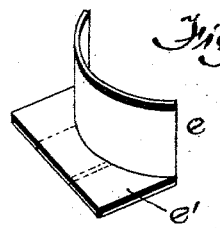
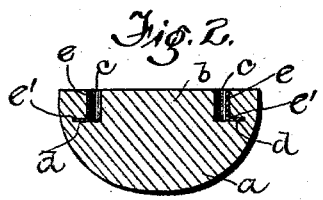
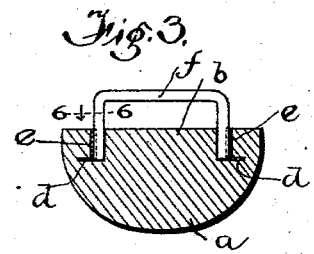
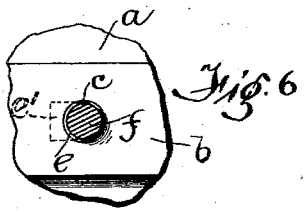
Witnesses
Horace G. Seitz
Geo. M. Copenhaver
Inventor
Moses I. Rubin
by Arthur W. Harrison
Attorney

UNITED STATES PATENT OFFICE.

MOSES I. RUBIN, OF PHILADELPHIA, PENNSYLVANIA.

ARTIFICIAL TOOTH.

SPECIFICATION forming part of Letters Patent No. 715,422, dated December 9, 1902.

Application filed February 4, 1902. Serial No. 92,532. (No model.)

*To all whom it may concern:*

Be it known that I, MOSES I. RUBIN, of No. 941 South Third street, in the city of Philadelphia, in the county of Philadelphia and State of Pennsylvania, have invented new and useful Improvements in Artificial Teeth; and I do hereby declare the following to be a full, clear, and exact description of said invention, reference being had to the accompanying drawings, and to the letters of reference marked thereon, which form a part of this specification.

This invention relation relates to artificial teeth, and has particular reference to the means whereby the tooth is secured to the vulcanizable plate.

The object of the invention is to produce an improved construction of the metallic fastener which serves to unite the tooth to the plate and to improved means for securing said metallic fastener to the tooth-body.

A common form of metallic fastener heretofore employed consists of headed pins having their ends permanently secured to the teeth, with their headed ends projecting therefrom to be embedded in the vulcanizable material of the plate. Staple-formed fasteners have, however, been employed. One such form of fastener has had its ends embedded in the material of the tooth before the latter is baked, and hence the fastener must necessarily be of a metal, such as platinum, which is fusible only at a temperature higher than that used to bake the tooth. Another form of fastener somewhat staple-shaped has been employed, the legs of the fastener being inserted in a single undercut recess in the tooth-body and the space around the legs and between them being filled with the vulcanizable material, whereby the fastener is held in said undercut recess; but this last-mentioned form has not been practical, because the vulcanizable material between the legs of the staple is not firm enough to permanently and practically secure the fastener in the tooth-body. Furthermore, it has been difficult to get the vulcanizable material in said undercut recess properly and so that it will also properly unite with the vulcanizable material of the plate.

The particular object of this invention is to provide means whereby a staple-shaped fastener of material cheaper than platinum, such as German silver, may be firmly connected with the tooth-body after the latter has been baked.

To these ends the invention consists in the construction of the artificial tooth and the fastener, substantially as hereinafter described and claimed.

In the accompanying drawings, Figure 1 is a perspective view of a tooth, showing the staple or loop in position. Fig. 2 is a horizontal sectional view taken through the pin-flange of the tooth, the staple or loop being omitted. Fig. 3 is a similar view with the staple or loop in place. Fig. 4 is an enlarged detail of the anchor which may be employed. Fig. 5 is a detail view of one form of staple or loop. Fig. 6 is an enlarged section on line 6 6 of Fig. 3.

One form of tooth-body is represented at $a$, having a pin-flange $b$. It is to be understood, however, that the invention may be applied to any form of tooth. The said pin-flange or any other suitable part of the tooth-body is provided with two substantially parallel recesses $c\ c$, said recesses being separated by a solid portion of the tooth-body. These recesses are molded in the tooth-body prior to baking, and a lateral recess $d$ extends from the bottom of each recess $c$. In the form represented in Figs. 2, 3, and 6 the lateral recesses $d$ are occupied by a lateral projection or toe $e'$ of an anchor $e$. When such anchors are employed, they are placed in the tooth when molded and are baked therein.

It is to be understood that the anchor may be of any suitable form and may vary from that represented in the figures mentioned. For instance, the toe portion of the anchor may be cut away either between the dotted lines represented in Fig. 4 or at either or both sides of said dotted lines. When this form of tooth is made, the staple or loop $f$ has the ends of its legs straight and substantially parallel with each other, and they are connected to the tooth by being inserted in the recesses $c\ c$ and soldered to the anchors.

Having thus described the invention, what is claimed as new is—

An artificial tooth having its body portion formed with two substantially parallel recesses baked therein, an anchor in each recess, each anchor comprising an angular piece of metal having one portion extending into the body portion at one side of the recess and another portion fitting one side of the recess, and a metallic staple having the ends of its legs secured to said anchors.

In testimony whereof I affix my signature in presence of two witnesses.

MOSES I. RUBIN.

Witnesses:
 SAMUEL S. BLOOM,
 STEPHEN K. CLIFTON.